United States Patent
Boehm et al.

(10) Patent No.: US 10,074,876 B2
(45) Date of Patent: Sep. 11, 2018

(54) METHOD FOR BALANCING OUT STATES OF CHARGE OF A BATTERY HAVING A PLURALITY OF BATTERY CELLS, AND A CORRESPONDING BATTERY MANAGEMENT SYSTEM AND BATTERY

(75) Inventors: Andre Boehm, Kornwestheim (DE); Frank Schindler, Reutlingen (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 1333 days.

(21) Appl. No.: 13/819,311

(22) PCT Filed: Aug. 9, 2011

(86) PCT No.: PCT/EP2011/063652
§ 371 (c)(1),
(2), (4) Date: May 24, 2013

(87) PCT Pub. No.: WO2012/028427
PCT Pub. Date: Mar. 8, 2012

(65) Prior Publication Data
US 2014/0159665 A1    Jun. 12, 2014

(30) Foreign Application Priority Data
Aug. 30, 2010 (DE) .................. 10 2010 039 913

(51) Int. Cl.
*H01M 10/44* (2006.01)
*B60L 11/18* (2006.01)
(Continued)

(52) U.S. Cl.
CPC ......... *H01M 10/44* (2013.01); *B60L 11/1851* (2013.01); *B60L 11/1866* (2013.01);
(Continued)

(58) Field of Classification Search
CPC ............ H01M 10/44; H01M 10/0525; H01M 10/441; B60L 11/1851; B60L 11/1866;
(Continued)

(56) References Cited

U.S. PATENT DOCUMENTS

| | | | |
|---|---|---|---|
| 5,710,504 A * | 1/1998 | Pascual | H02J 7/0018 180/65.8 |
| 6,844,703 B2 * | 1/2005 | Canter | B64G 1/425 320/131 |

(Continued)

FOREIGN PATENT DOCUMENTS

| | | |
|---|---|---|
| DE | 10 2006 022 394 A1 | 11/2007 |
| DE | 10 2008 043 585 | 5/2011 |

(Continued)

OTHER PUBLICATIONS

MIT's a guide to understanding battery specifications; MIT Electrical Vehicle Teams, Dec. 2008, p. 1 and 2.*

(Continued)

*Primary Examiner* — Nathaniel Pelton
*Assistant Examiner* — Dung V Bui
(74) *Attorney, Agent, or Firm* — Maginot, Moore & Beck LLP (57) ABSTRACT

The disclosure relates to a method for balancing out states of charge of a battery which has a number of N battery cells. In order to balance out the individual states of charge (SOCn) of the n=1 to N cells, the state of charge of at least one cell is changed to a target state of charge (SOCtarget,n) which depends on the discharge depth (DODk) of the cell having the lowest capacity (Capk) according to the equation SOCtarget,n=1−DODk/Capn, Capn being the capacity of the nth cell to be changed. Advantageously, the method is suitable for optimizing the voltage or the energy content of a battery that is constituted of a plurality of cells.

10 Claims, 3 Drawing Sheets

(51) Int. Cl.
*H01M 10/0525* (2010.01)
*H02J 7/00* (2006.01)

(52) U.S. Cl.
CPC ..... *H01M 10/0525* (2013.01); *H01M 10/441* (2013.01); *H02J 7/0014* (2013.01); *Y02E 60/122* (2013.01); *Y02T 10/7011* (2013.01); *Y02T 10/7055* (2013.01); *Y02T 10/7061* (2013.01)

(58) Field of Classification Search
CPC .. H02J 7/0014; Y02E 60/122; Y02T 10/7011; Y02T 10/7055; Y02T 10/7061
USPC ........................................................ 320/119
See application file for complete search history.

(56) References Cited

U.S. PATENT DOCUMENTS

| | | | | |
|---|---|---|---|---|
| 8,617,745 | B2* | 12/2013 | Gozdz | H01M 4/133 429/231.5 |
| 8,917,061 | B2* | 12/2014 | Zhu | H02J 7/0016 320/119 |
| 2007/0236183 | A1* | 10/2007 | Darilek | G01R 31/361 320/132 |
| 2008/0197807 | A1* | 8/2008 | Simopoulos | G01R 31/3679 320/132 |
| 2008/0233469 | A1* | 9/2008 | Drozdz | G01R 31/361 429/61 |
| 2008/0278115 | A1* | 11/2008 | Huggins | B60L 3/12 320/134 |
| 2009/0128094 | A1 | 5/2009 | Okuto | |
| 2009/0278496 | A1* | 11/2009 | Nakao | H02J 7/0016 320/118 |
| 2010/0121511 | A1* | 5/2010 | Onnerud | B60L 11/1851 701/22 |
| 2010/0148726 | A1* | 6/2010 | Lee | H02J 7/0016 320/118 |
| 2014/0159665 | A1* | 6/2014 | Boehm | B60L 11/1851 320/119 |

FOREIGN PATENT DOCUMENTS

EP 1 283 121 A2 2/2003
WO 2009/149690 A1 12/2009

OTHER PUBLICATIONS

International Search Report corresponding to PCT Application No. PCT/EP2011/063652, dated Feb. 3, 2012 (German and English language document) (5 pages).

* cited by examiner

METHOD FOR BALANCING OUT STATES OF CHARGE OF A BATTERY HAVING A PLURALITY OF BATTERY CELLS, AND A CORRESPONDING BATTERY MANAGEMENT SYSTEM AND BATTERY

This application is a 35 U.S.C. § 371 National Stage Application of PCT/EP2011/063652, filed on Aug. 9, 2011, which claims the benefit of priority to Serial No. DE 10 2010 039 913.2, filed on Aug. 30, 2010 in Germany, the disclosures of which are incorporated herein by reference in their entirety.

The present disclosure relates to a method for balancing states of charge of a battery having a plurality of battery cells, to a battery management system which comprises the method according to the disclosure, to a battery, in particular a lithium-ion battery, having the battery management system according to the disclosure, and to a motor vehicle having the battery according to the disclosure. The battery can be used, in particular, to drive the motor vehicle.

BACKGROUND

In the future it is expected that, for stationary applications such as, for example, wind turbine systems, emergency current units or island networks, as well as in vehicles such as, for example, hybrid vehicles or pure electric vehicles, battery systems will increasingly be used on which stringent requirements are made in terms of useful energy content, charging/discharging efficiency and reliability.

In order to be able to meet with the requirements with respect to available energy content, maximum power and overall voltage, many individual battery cells are connected in series and partially additionally in parallel. For example, in hybrid vehicles and electric vehicles, battery packs are used comprising Li ions or NiMH technology, which battery packs are composed of a large number of electrochemical cells connected in series.

Such a large number of battery cells which are connected in series entail a number of problems. For safety reasons and in order to achieve sufficient accuracy in the measurement of the voltage, the cell voltages of the individual battery cells must be measured individually and checked for compliance with upper limits and lower limits. Because of the series connection of the battery cells, the same current flows through all the battery cells, i.e. the quantity of the charge which is extracted during discharging and input during charging is also identical for all the battery cells. As a result, the cell with the lowest capacity limits the overall charge of the pack. Since as a rule there is a direct relationship between the loss of capacity and the increase in internal resistance for electrochemical cells, the cell with the lowest capacity generally also has the lowest power. If the capacity of a battery cell therefore differs from that of another, for example due to aging, the battery cells with a relatively high capacity can only be charged as far as the battery cell with the lowest capacity. Furthermore, the defect in an individual battery cell causes the entire battery to fail because the current can no longer flow through the defective battery cell and therefore through the battery.

A measure of the quantity of energy stored in a battery cell is what is referred to as the state of charge (SOC). It is to be noted here that the initial states of charge of the battery cells when they are assembled to form a battery will never be precisely the same. Furthermore, owing to a certain product variation during manufacture, the battery cells always differ slightly in their parameters and therefore also in their reaction of the state of charge to a current which is impressed from the outside. These differences can increase further due to aging of the battery cells.

It is known to use a battery management system to monitor the states of charge of a battery. In addition to the monitoring of safety, the longest possible service life of the battery is to be ensured and it is to be ensured that the states of charge of the individual cells are matched to one another. This is done by suitable cell balancing. Cell balancing or balancing of the states of charge is generally performed resistively. For this purpose, a resistor and a switching element are provided for each cell in order to be able to discharge individual cells in a targeted fashion. DE 10 2006 022 394 A1 discloses a device for balancing the charge of an energy source with a plurality of cells, in which the cells are connected to a discharging unit which has the purpose of balancing charges and at least partially discharges the cells. However, according to the prior art, it is also possible to carry out the cell balancing capacitively, i.e. with connected capacitors, or inductively, that is to say by means of connected inductors. In these two cases, energy can be exchanged between the cells with a limited efficiency while in the case of resistive cell balancing energy can only be converted into heat, and is therefore lost.

For hybrid vehicles, a high performance level is advantageous at any time, both in the charging direction for the purpose of recuperation and in the discharging direction for the purpose of acceleration. It is known that the maximum permitted charging power decreases as the state of charge rises, while the maximum permitted discharging power increases. For this reason, according to the prior art for hybrid vehicles, it would be desirable to operate a battery pack for hybrid vehicles in a state of charge of 50% in order to constantly ensure a high power. However, as a rule, in practice an operating window is used, for example between 40% and 60% of the state of charge. For what are referred to as "plug-in hybrids", the operating window is correspondingly larger, for example 10% to 90% of the state of charge.

In contrast, in pure electric vehicles the energy content is the most important criterion. In contrast to hybrid vehicles, this relates less to short-term acceleration but instead more to ensuring the operational reliability of the vehicle over the longest possible time period, and of making available the largest possible amount of energy at any time.

A prior art balancing strategy attempts to achieve a continuously equal state of charge of all the cells. For this purpose, as a rule, balancing to an identical quiescent voltage of all the cells is performed. In the case of new cells with a virtually identical capacity, this strategy is justified. However, in the case of cells with differing capacities, such as occur due to production variations and aging, this balancing strategy leads to unnecessary energy losses as a result of the balancing.

Figure 1:
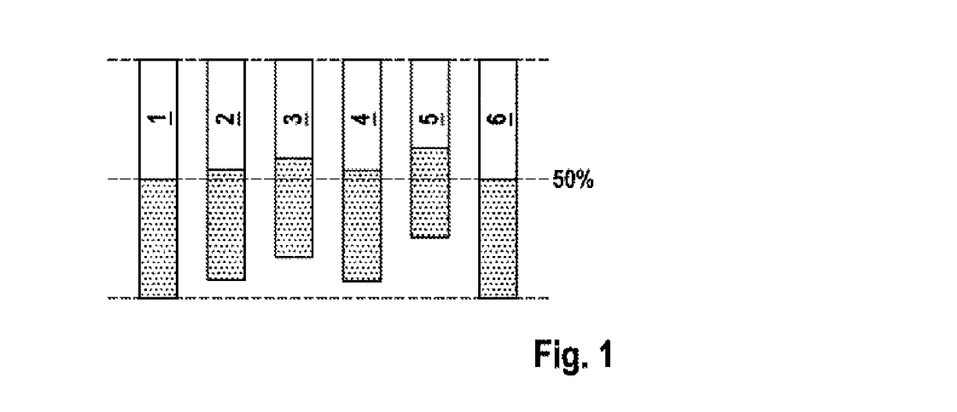
FIG. 1 shows the states of charge and capacities of a battery according to the prior art with six individual cells and individual states of charge of 50%.

FIG. 1 shows by way of example six electro-chemical cells with different charging capacities owing to aging, which cells have been adjusted to an individual state of charge of 50% according to such a balancing method according to the prior art. If the battery pack is then discharged until the cell with the lowest capacity, which is cell 5 in the example, is almost completely discharged, all the other cells have relatively high states of charge viewed individually. When the balancing is continued according to the above strategy, they are therefore discharged until they have also reached the individual state of charge of cell 5. However, this means that energy has to be unnecessarily destroyed in all the cells apart from the cell with the lowest capacity.

SUMMARY

According to the disclosure, a method for balancing states of charge of a battery having a number of N battery cells is presented, wherein in order to balance the individual states of charge of the n=1 to N cells the state of charge $SOC_n$ of at least one cell is changed to a target state of the charge $SOC_{Target,n}$ which depends on the depth of discharge $DOD_k$ of the cell with the lowest capacity $Cap_k$ according to the equation $SOC_{Target,n}=1\ DOD_k/Cap_n$, wherein $Cap_n$ is the capacity of the cell to be changed.

This is preferably carried out only until balancing is necessary or possible, that is to say until an abort criterion of the balancing is met. This abort criterion can depend on a function of the difference between the present state of charge for the respective cell and the target state of charge. An abort criterion would be $f(SOC_n-SOC_{Target,n})>A$, with A as a threshold value which is to be defined.

Using this method, the states of charge of individual electrochemical battery cells of a battery are balanced. The method according to the disclosure having the features of the independent claim has the advantage that the energy losses are reduced compared to the prior art within the scope of balancing of the states of charge. In this context, at the same time the cell energy content is optimized. In addition, the duration of the balancing is reduced. There is no need to use any further hardware for balancing. The method can be implemented as a computer program using software, and can therefore be implemented cost-effectively.

More precisely, the method firstly comprises the step of determining the individual cell capacities $Cap_n$ of all the n=1 to N cells. This is followed by the determination of a k-th cell with the lowest cell capacity $Cap_k$ of the n=1 to N cells and the determination of the individual states of charge $SOC_n$ of all the n=1 to N cells. The determination of the depth of discharge $DOD_n$ of all the n=1 to N cells then follows. This can preferably take place according to the equation $DOD_n=Cap_n-SOC_n*Cap_n$. In a further step, a target depth of discharge $DOD_{Target,n}$ is then determined for all the n=1 to N cells, in which $DOD_{Target,n}=DOD_k$, i.e. the target depth of discharge is equal to the depth of discharge of the cell with the lowest capacity. From the target depth of discharge, the target state of charge $SOC_{Target,n}$ is determined for all n=1 to N cells from $SOC_{Target,n}=1-DOD_{Target,n}/Cap_n$. After this, the deviation of the state of charge $SOC_n$ of one cell from its target state of charge $SOC_{Target,n}$ is determined for all the n=1 to N cells according to $\Delta SOC_{Target,n}=SOC_n\ SOC_{Target,n}$. In a further step, the minimum deviation $\Delta SOC_{min}$ of the state of charge $SOC_n$ of a cell from its target state of charge $SOC_{Target,n}$ is determined for all n=1 to N cells from $\Delta SOC_{min}=\min(\Delta SOC_{Target,n})$. This is then followed by the discharging of at least one of the n=1 to N cells for which the following applies: $\Delta SOC_{Target,n}-\Delta SOC_{min}>X$ where X is a parameter for which $X>0$ applies. If $\Delta SOC_{Target,n}-\Delta SOC_{min}\leq X$ then applies for all of the n=1 to N cells, the method is then ended. However, if this does not apply, that is to say for at least one cell $\Delta SOC_{Target,n}-\Delta SOC_{min}>X$, then the process returns to the step of determining the individual states of charge and the subsequent steps are repeated.

In the discharging step, all the cells for which $\Delta SOC_{Target,n}-\Delta SOC_{min}>X$ applies can preferably be discharged, and even more preferably they can be discharged simultaneously. This reduces the duration of the balancing further.

The return to the step of determining the states of charge can preferably be performed at predefined time intervals. However, it can also take place continuously.

The state of charge is preferably specified in percentages, and the parameter X is preferably greater than zero and smaller than 6%, even more preferably smaller than 3%.

The method can advantageously also be used for capacitively and inductively balancing states of charge. In addition, after the discharging step and before the step of returning to the determination of the states of charge, it then comprises the step of feeding in the discharge current of the discharged cells in order to charge at least one of the n=1 to N cells for which the following applies: $\Delta SOC_{Target,n}-\Delta SOC_{min}<Y$, where $X>Y$.

In one preferred exemplary embodiment, all the cells for which $\Delta SOC_{Target,n}-\Delta SOC_{min}<Y$ applies are charged, and are more preferably charged simultaneously.

Accordingly, a battery management system is proposed for a battery, in particular an Li-ion battery which comprises the method according to the disclosure which is described above.

Analogously, a battery, in particular an Li-ion battery, is specified, with a battery management system according to the disclosure, and a motor vehicle with a battery according to the disclosure is specified.

Advantageous developments of the disclosure are specified in the dependent claims and described in the description.

BRIEF DESCRIPTION OF THE DRAWINGS

Exemplary embodiments of the disclosure are illustrated in the drawings and explained in more detail in the following description.

In said drawings.

DETAILED DESCRIPTION

The present disclosure relates to a method for balancing the states of charge of individual cells of a battery or of a battery pack, in particular of an Li-ion battery of an Li-ion battery pack.

Figure 2:
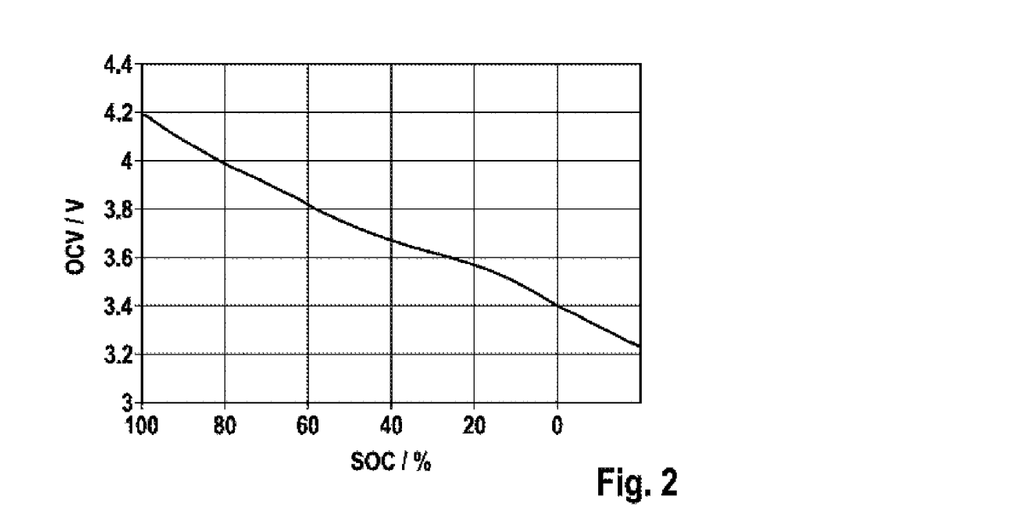
FIG. 2 shows the relationship between the open circuit voltage of an electrochemical storage and the state of charge.

FIG. 2 shows the dependence of the quiescent voltage of an electrochemical cell on the state of charge. The OCV (open circuit voltage) characteristic curve of an Li-ion cell is illustrated. The quiescent voltage rises with the state of charge for electrochemical storage systems. This takes place to differing degrees depending on the state of charge.

For cells which, in a battery pack, can be operated only in a capacity window which is smaller than the total capacity of the cell, it is advantageous according to the disclosure to position the capacity window in the upper state of charge range. In FIG. 1, this applies to all the cells apart from the cell with the lowest capacity. In this window, the cell voltage is on average higher than in every other range. The energy which can be extracted is consequently at a maximum in this window. Furthermore, the internal resistance for many types of cell decreases as the state of charge rises, which further increases the energy which can be extracted.

In the following method, the state of charge is given as a percentage with "SOC" (State of Charge), where 100% corresponds to the state in which the cell is fully charged. The capacity of a cell is abbreviated with "Cap" and is given in the text which follows using the unit "Ah". The depth of discharge is abbreviated with DOD (Depth of Discharge), and is also given in "Ah". Given a depth of discharge of 0 Ah, the cell is fully charged. The depth of discharge is calculated from DOD=(1−SOC)*Cap.

Figure 3:
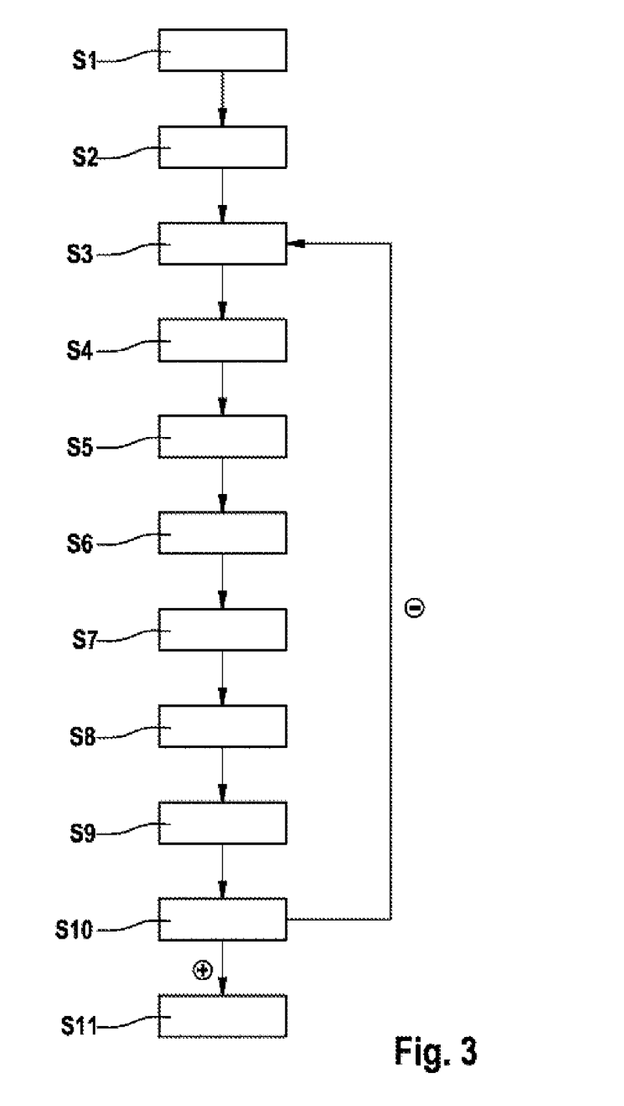
FIG. 3 shows the method according to the disclosure for balancing the states of charge of individual cells of a battery in a schematic illustration.

For the purpose of balancing all the N cells of a battery pack in such a way that the energy is optimized, the following method can be advantageously applied (see FIG. 3):

S1 Determination of the individual cell capacities $Cap_n$ of all the n=1 to N cells;
S2 Determination of a k-th cell with the lowest cell capacity $Cap_k$ of the n=1 to N cells;
S3 Determination of the individual states of charge $SOC_n$ of all the n=1 to N cells;
S4 Determination of the depth of discharge $DOD_n$ of all the n=1 to N cells; this preferably happens from: $DOD_n=Cap_n-SOC_n*Cap_n$;
S5 Determination of the target depth of discharge $DOD_{Target,n}$ for all the n=1 to N cells from: $DOD_{Target,n}=DOD_k$;
S6 Determination of a target state of charge $SOC_{Target,n}$ for all the n=1 to N cells from: $SOC_{Target,n}=1-DOD_{Target,n}/Cap_n$;
S7 Calculation of the deviation of the state of charge $SOC_n$ of a cell from its target state of charge $SOC_{Target,n}$ for all the n=1 to N cells:

$\Delta SOC_{Target,n}=SOC_n-SOC_{Target,n}$;

S8 Calculation of the minimum deviation $\Delta SOC_{min}$ of the state of charge $SOC_n$ of a cell from its target state of charge $SOC_{Target,n}$ for all the n=1 to N cells: $\Delta SOC_{min}=\min \Delta SOC_{Target,n}$;
S9 Discharging of at least one of the n=1 to N cells for which the following applies:

$\Delta SOC_{Target,n}-\Delta SOC_{min}>X$, where X is a parameter for which X>0;
S10 If $\Delta SOC_{Target,n}-\Delta SOC_{min}\leq X$ applies to all of the n=1 to N cells, the process jumps to the next step S11; if this does not apply to all the cells, the process returns to the step S3 of the determination of the individual states of charge S3 and the following steps are repeated;
S11 Ending of the method.

The above method relates in this context firstly to the resistive balancing of states of charge. In the case of resistive balancing, the cells can merely be discharged, with the result that in the case of resistive balancing, only the discharging in step S9 is significant. In another exemplary embodiment, the capacitive or inductive balancing is also described, during which cells can also be charged.

Figure 4:
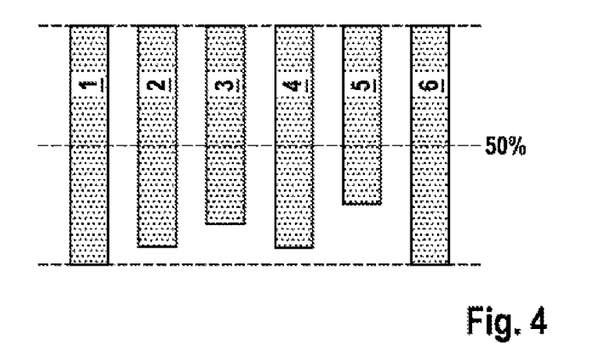
FIG. 4 shows the states of charge and capacities of a battery with six individual cells at a 100% state of charge of a pack according to the method according to the disclosure.

In the balancing method according to the disclosure, all the cells of a battery pack are balanced in such a way that during the subsequent charging of the battery, for example via a socket, to a pack state of charge of 100%, said cells each have an individual state of charge of 100%. This is done by virtue of the dependence of the target state of charge $SOC_{Target,n}$ on the depth of discharge $DOD_k$ of the cell "k" with the lowest capacity and is illustrated in FIG. 4 for the six cells in FIG. 1. Since in this way each battery cell is continuously operated in the highest possible SOC window and therefore with the highest possible voltage (see FIG. 2), on average the highest possible battery voltage is available. For this reason, the method according to the disclosure optimizes the energy content as an integral of the quantity of charge per time multiplied by the voltage.

The balancing method according to the disclosure can be used not only under load but also during a charging process by an external energy source.

In the case of relatively low pack states of charge, different individual states of charge occur for each cell depending on the respective cell capacity. This is shown by way of example for a battery pack with N=6 battery cells in FIG. 5.

Figure 5:
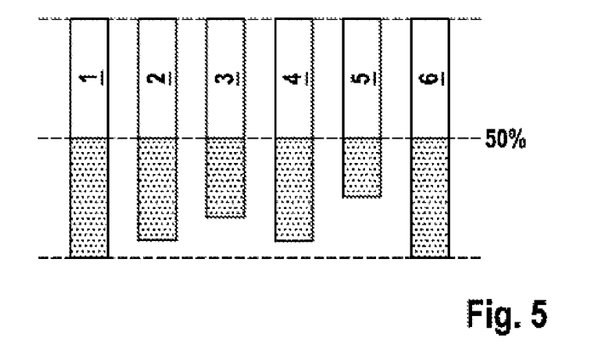
FIG. 5 shows a result of the balancing of a battery according to the disclosure.

If the cell with the lowest capacity, that is to say cell 5, is completely discharged, according to the balancing method according to the disclosure all the other cells retain their charge content and are not discharged further.

In one preferred embodiment, the method according to the disclosure is part of a battery management system of a battery. In the text which follows, it is therefore described by way of example that the method according to the disclosure is carried out by means of a battery management system. However, this does not occur in a restrictive fashion but rather merely in an exemplary fashion.

The respective variables which are necessary for the course of the method can be subsequently calculated mathematically or determined or measured in some other way, for example by means of specification sheets.

In Step 1, the cell capacities are preferably determined or measured by means of a battery management system. In the next Step S2, the cell with the lowest cell capacity is then determined from the acquired data. Owing to the series connection of the cells, the cell with the lowest capacity limits the total charge of the pack. In the method according to the disclosure, the balancing is performed with respect to the depth of discharge of the cell with the lowest capacity. In Step S3, the state of charge of each individual electrochemical cell of the battery is determined or measured. This is in turn preferably carried out using the battery management system. The depth of discharge is then calculated from the individual state of charge by means of the equation specified in Step S4, or is determined or measured in some other way. In Step S5, the desired target depth of discharge is then adjusted therefrom for each cell, so as to be equal to the depth of discharge of the cell with the lowest capacity. Therefore, no cell can be discharged via the depth of discharge of the cell with the lowest capacity. The target state of charge is then calculated from the target depth of discharge according to the equation specified above in Step S6. For balancing, in Step S7 the deviation of the present state of charge from the target state of charge $\Delta SOC_{Target,n}=SOC_n-SOC_{Target,n}$ for each cell is determined or calculated. The minimum deviation $\Delta SOC_{min}$ is then determined from the deviations (S8). If the difference between the deviation $\Delta SOC_{Target,n}=SOC_n-SOC_{Target,n}$ and the minimum deviation $\Delta SOC_{min}$ is then greater than a parameter X which is predefined or can be selected, at least one of those cells for which this applies is discharged (S9). All the cells are preferably discharged simultaneously. In Step S10 it is checked whether in fact a cell is discharged or is to be discharged. If the answer is affirmative, the process jumps back to the step S3 and the method is resumed from there. However, if a cell no longer has to be discharged, the process jumps to the next step and the method is ended (S11).

In this context, the jump back in Step S10 can occur continuously (if the computing time is short compared to the discharging process) or else discretely at fixed time intervals, for example 1-10 times per second. However, depending on the accuracy of the method, a time period of minutes may also be appropriate. It is therefore an iterative method in which the parameter X specifies precisely how balancing is to be performed. The parameter X may be an element of the real or natural positive numbers. X can be smaller than 10%, and X is preferably smaller than 6%, and even more preferably smaller than 3%. A relatively high parameter speeds up the method, but makes the adaptation less precise. A low parameter leads to a relatively low bandwidth of the individual states of charge after the balancing but a longer adaptation period.

Table 1 shows an exemplary embodiment of the method according to the disclosure for the resistive balancing of a battery, in particular of an Li-ion battery with N=6 individual cells. The parameter X for the discharging is, for example, 4% here. As is apparent from Table 1, the cell 3 is the cell with the lowest capacity, here 18.3 Ah and has a state of charge of 62%. What is referred to as the target depth of discharge $DOD_{Target}$ of the individual cells is then adjusted so as to be equal to the depth of discharge of this cell with the lowest capacity. In accordance with this method, the cell 5 would have to have been charged since its target state of charge is 66%, whereas the actual state of charge is only 63%. In the pure resistive method, however, this is not possible. In the case of a threshold value for the deviation X of 4%, in the present example, the cells 1, 2, 4 and 6 are discharged in the first step. The further profiles of the iterative method are not illustrated.

TABLE 1

Example 1 for a battery with 6 individual cells where X = 4%.

| Cell | Cap [Ah] | SOC | DOD [Ah] | Min. Cap | $DOD_{Target}$ | $SOC_{Target}$ | $\Delta SOC_{Target}$ | $\Delta SOC_{min}$ | $\Delta SOC_{Target} - \Delta SOC_{min}$ | Balancing |
|---|---|---|---|---|---|---|---|---|---|---|
| 1 | 19.9 | 67% | 6.57 |   | 6.95 | 65% | 2% |   | 4.5% | yes |
| 2 | 18.7 | 66% | 6.36 |   | 6.95 | 63% | 3% |   | 5.8% | yes |
| 3 | 18.3 | 62% | 6.95 | X | 6.95 | 62% | 0% |   | 2.6% |   |
| 4 | 18.9 | 70% | 5.67 |   | 6.95 | 63% | 7% |   | 9.4% | yes |
| 5 | 20.2 | 63% | 7.47 |   | 6.95 | 66% | −3% | −3% | 0.0% |   |
| 6 | 19.6 | 66% | 6.66 |   | 6.95 | 65% | 1% |   | 4.1% | yes |

In a further exemplary embodiment, the method is also adapted for capacitive and inductive balancing of the states of charge. In this context, in Step S9 of the method the discharge current of the discharged cells is used for charging other cells. At least one of the cells for which $\Delta SOC_{Target,n} - \Delta SOC_{min} < Y$ applies is then charged, where X>Y. All the cells for which the relationship applies are preferably charged together. The parameter Y can be freely selected within the specified limits with respect to the parameter X.

The method according to the disclosure is preferably implemented as software in a battery management system of a battery. This software solution permits the method to be implemented in a way which is as cost-effective and flexible as possible.

The battery with the corresponding battery management system may be part of a motor vehicle. It is preferably part of a drive system of a motor vehicle and coupled to the engine of the motor vehicle.

The invention claimed is:

1. A method for balancing states of charge of a battery including a plurality of battery cells, comprising:
   - (S1a) determining individual cell capacities ($Cap_n$) for each of the plurality of battery cells, wherein at least two of the plurality of battery cells have different capacities; and
   - (S1b) changing a state of charge of at least one battery cell of the plurality of battery cells according to the equation $$SOC_{Target,n} = 1 - DOD_k / Cap_n,$$

wherein
   $SOC_{Target,n}$ is a target state of charge for the at least one battery cell as a percentage,
   $DOD_k$ is a depth of discharge of a battery cell of the plurality of battery cells with the lowest capacity in Ah, and
   $Cap_n$ is a capacity of the at least one battery cell in Ah.

2. The method as claimed in claim 1, further comprising the steps:
   - (S2) determining the lowest individual cell capacity ($Cap_k$) N of the plurality of battery cells;
   - (S3) determining individual states of charge ($SOC_n$) for each of the plurality of battery cells;
   - (S4) determining a depth of discharge ($DOD_n$) for each of the plurality of battery cells;
   - (S5) determining an individual target depth of discharge ($DOD_{Target,n}$) for each of the plurality of battery cells from: $DOD_{Target,n} = DOD_k$;
   - (S6) determining an individual target state of charge ($SOC_{Target,n}$) for each of the plurality of battery cells from: $SOC_{Target,n} = 1 - DOD_{Target,n} / Cap_n$;
   - (S7) determining a deviation of the state of charge ($\Delta SOC_n$) of a battery cell from its target state of charge ($SOC_{Target,n}$) for each of the plurality of battery cells using:

$$\Delta SOC_{Target,n} = SOC_n - SOC_{Target,n};$$

- (S8) determining a minimum deviation of the state of charge ($\Delta SOC_{min}$) of the plurality of battery cells; and
   - (S9) discharging the at least one of the plurality of battery cells for which the following applies: $\Delta SOC_{Target,n} - \Delta SOC_{min} > X$, where X is a parameter for which X>0;
   - (S10) wherein if $\Delta SOC_{Target,n} - \Delta SOC_{min} \leq X$ applies to all of the plurality of battery cells, the method ends; if $\Delta SOC_{Target,n} - \Delta SOC_{min} \leq X$ does not apply to all the plurality of battery cells, the method returns to the step (S3) and the steps (S3) through (S10) are repeated.

3. The method as claimed in claim 2, wherein in the step (S9), all the battery cells for which $\Delta SOC_{Target,n} - \Delta SOC_{min} > X$ applies are discharged.

4. The method as claimed in claim 2, further comprising: performing the return to the step (S3) at predefined time intervals.

5. The method as claimed in claim 2, wherein: the state of charge (SOC) is specified in percentages, and the parameter X is greater than zero and smaller than 3%.

6. The method as claimed in claim 2, wherein the step (S9) further comprises:
feeding in a discharge current of discharged battery cells of the number of N battery cells in order to charge at least one of the n=1 to N battery cells, for which the following applies: $\Delta SOC_{Target,n} - \Delta SOC_{min} < Y$, where X>Y, such that the states of charge are balanced capacitively and inductively.

7. The method as claimed in claim 6, wherein all the battery cells of the number of N battery cells for which $\Delta SOC_{Target,n} - \Delta SOC_{min} <$ applies are charged simultaneously.

8. The method as claimed in claim 1, wherein the method is performed by a battery management system.

9. A Li-ion battery, comprising:
a plurality of battery cells; and
a battery management system configured to perform a method for balancing states of charge of the plurality of battery cells,
wherein the method includes determining individual cell capacities ($Cap_n$) for each of the plurality of battery cells, wherein at least two of the plurality of battery cells have different capacities, and changing a state of charge of at least one battery cell of the plurality of battery cells according to the equation $$SOC_{Target,n} = 1 - DOD_k/Cap_n,$$

wherein
$SOC_{Target,n}$ is a target state of charge of the at least one battery cell as a percentage,
$DOD_k$ is a depth of discharge of a battery cell of the plurality of battery cells with the lowest capacity in Ah, and
$Cap_n$ is a capacity of the at least one battery cell in Ah.

10. A motor vehicle comprising:
a battery including (i) a plurality of battery cells, and (ii) a battery management system configured to perform a method for balancing states of charge of the plurality of battery cells,
wherein the method includes determining individual cell capacities ($Cap_n$) for each of the plurality of battery cells, wherein at least two of the plurality of battery cells have different capacities, and changing a state of charge of at least one battery cell of the plurality of battery cells according to the equation $$SOC_{Target,n} = 1 - DOD_k/Cap_n,$$

wherein
$SOC_{Target,n}$ is a target state of charge of the at least one battery cell as a percentage,
$DOD_k$ is a depth of discharge of the battery cell of the plurality of battery cells with the lowest capacity in Ah, and
$Cap_n$ is a capacity of the at least one battery cell in Ah.

* * * * *

UNITED STATES PATENT AND TRADEMARK OFFICE
CERTIFICATE OF CORRECTION

PATENT NO. : 10,074,876 B2
APPLICATION NO. : 13/819311
DATED : September 11, 2018
INVENTOR(S) : Boehm et al.

Page 1 of 1

It is certified that error appears in the above-identified patent and that said Letters Patent is hereby corrected as shown below:

In the Claims

In Column 9, Lines 15-17, Lines 1-3 of Claim 7 should read:
7. The method as claimed in claim 6, wherein all the
battery cells of the number of N battery cells for which
$\Delta SOC_{Target,n} - \Delta SOC_{min} < Y$ applies are charged simultaneously.

Signed and Sealed this
Seventh Day of May, 2019

Andrei Iancu
*Director of the United States Patent and Trademark Office*